Patented May 17, 1949

2,470,562

UNITED STATES PATENT OFFICE 2,470,562

ORGANOSILOXANES AND METHODS OF MAKING THEM

James Franklin Hyde, Corning, N. Y., assignor to Corning Glass Works, Corning, N. Y., a corporation of New York No Drawing. Application April 12, 1944, Serial No. 530,749

7 Claims. (Cl. 260—46.5)

This invention relates to new compositions of matter and their preparation and, more particularly, to organo-siloxanes and methods of preparing them.

This application is a continuation-in-part of my copending applications Serial Number 432,528 filed February 26, 1942, Serial Number 467,146 filed November 27, 1942, now patent Number 2,456,783, and Serial Number 483,450 filed April 17, 1943, now abandoned, all assigned to the assignee of the present invention.

The hydrolysis of a mono-silane of the type $SiX_4$, where X is a hydrolyzable radical such as halogen, alkoxy, aroxy, acyloxy, hydrogen, etc., does not result in a simple hydroxy compound but produces instead a brittle, insoluble, infusible siliceous solid comprising a three-dimensional network of structural units composed of siloxane linkages as a result of the concurrent or subsequent loss of water from the intermediately formed hydroxy compound.

Type I

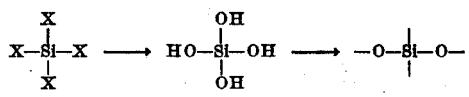

The formation of a siloxane linkage generally results from the close approach of two hydroxyl groups and subsequent elimination of water. It may also result from the close approach of one hydroxyl group to a hydrolyzable group such as halogen, acyloxy or alkoxy and subsequent elimination of hydrogen halide, carboxylic acid or alcohol, respectively. Such eliminations are catalyzed by mineral acids, especially hydrochloric and sulphuric and by alkali metal hydroxides, especially sodium hydroxide. It is apparent that, in the formation of such a rigid structure, many hydroxyl groups become isolated and block some of the possible cross-linkages. As the structural network becomes more complicated, dehydration becomes increasingly more difficult, and the result is a partially dehydrated siliceous mass of poor dimensional stability.

Organo-substituted silanes of the type $RSiY_3$ are prepared by means of the well-known Grignard reaction, where R may be any organic radical which is capable of reacting with magnesium to form a Grignard reagent and which is attached to silicon through a carbon atom and each Y is a hydrolyzable radical such as hydrogen, halogens, alkoxy, aroxy, acyloxy, etc. By hydrolyzable radical is meant, in general, any radical which is attached to silicon by other than carbon-silicon linkage and which under the same set of conditions is more readily hydrolyzed than an organic radical directly attached to silicon through carbon-silicon linkage. Such organo-substituted silanes are also hydrolyzed on treatment with water, although the reaction is less vigorous than in the case of the unsubstituted silanes under comparable conditions. Here also, concurrent dehydration or condensation with splitting out of water may occur so that a partially dehydrated product may result which can further be dehydrated by heat.

Type II

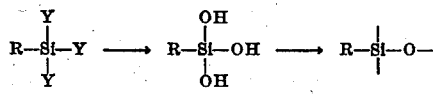

Here it will be seen that in each structural unit one of the four silicon bonds is blocked by the organic radical R, and only three siloxane linkages can form. Such compounds are still capable of three-dimensional polymerization.

The chemical and structural changes occurring in this type of substituted silanes are the same as those described above in the hydrolysis of $SiX_4$. The chief distinction arises from the fact that the property of solubility in organic solvents, particularly in the lower stages of condensation, is acquired due to the presence of the organic radical. The tendency of intermediate partially dehydrated products to further dehydrate is also decreased. The latter tendency is more noticeable with increasing size of the radical. As the stage of essentially complete dehydration is approached, the mono-substituted products lose their solubility and become hard and brittle. However, there is a marked improvement in dimensional stability over the hydrolysis product of $SiX_4$.

Organo-substituted silanes of the type

may also be prepared by the Grignard reaction where R', R'', and R''' are organic radicals which are capable of reacting with magnesium to form Grignard reagents, and which are not necessarily the same, and where Z is a hydrolyzable radical such as X and Y defined above. When these silanes are hydrolyzed and dehydrated, they yield simple oxides in the structural unit of which three of the four silicon bonds are blocked by the organic radicals R', R'' and R'''.

Type III

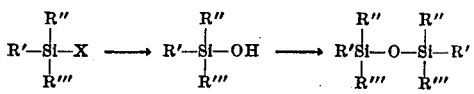

In this case, ease of hydrolysis is further diminished and in some cases the intermediate hydroxy silanes can be isolated. The completely dehydrated product is dimeric because only one siloxane linkage can be formed. The dimers are either crystalline or liquid.

Prior attempts to utilize the above-described reactions have not contemplated combinations thereof, but have been confined more or less to the individual reactions and their products. Such products, as shown above, have limited utility and the range of properties obtainable in the products of a given type of reaction is relatively restricted. For example, the product resulting from Type I reaction is an insoluble, infusible gel of little utility; Type III reaction yields generally inert liquid products which, although they are soluble in organic solvents, cannot be polymerized beyond the dimer and hence cannot be utilized per se for coating compositions, resinous impregnants and the like.

An object of this invention is the production of new and useful products from these reactions which will have desirable predetermined properties.

Another object is to combine the above-described reactions and thus to inter-condense the hydrolysis products of at least one non-organo-substituted mono-silane, at least one mono-organo-substituted mono-silane and at least one tri-organo-substituted mono-silane.

Another object is to produce liquid products of varying viscosity.

Another object is to produce thermoplastic resinous products.

Another object is to produce thermosetting resinous products.

A further object of the present invention is to prepare organo-siloxanes which contain silicon atoms having no organic radicals attached thereto through carbon-silicon linkages and silicon atoms having one and three organic radicals respectively attached thereto through carbon-silicon linkages.

The new method comprises mixing together at least one compound of each of the types $SiX_4$, $RSiY_3$, $R'R''R'''SiZ$, where R, R', R'' and R''' are the same or different organic radicals attached to silicon through carbon-silicon linkages and where X, Y and Z are the same or different hydrolyzable radicals attached to silicon by other than carbon-silicon linkages, and causing them to hydrolyze together and to become inter-condensed. It is to be understood that each of the silanes is present in appreciable quantity, i. e., in amount sufficient to produce a perceptible effect on the properties of the resulting inter-condensate. One method of accomplishing inter-condensation is by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above-recited procedure in general is to be preferred. The use of a water miscible solvent for diluting the hydrolyzable mixture or water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

Hydrolysis and dehydration of the above mixture of mono-silanes result in inter-condensation or formation of inter-connecting oxygen linkages between the silicon atoms of the various silanes. The variety of the substituted organic radicals is limited only by their ability to form a Grignard reagent. The radicals which may thus be substituted may include alkyl radicals such as methyl, ethyl, propyl, isopropyl, butyl, isobutyl, amyl, hexyl, heptyl to octadecyl and higher; alicyclic radicals such as cyclopentyl, cyclohexyl, etc., aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls, as methyl naphthyl, diethyl naphthyl, tripropyl naphthyl, etc.; tetra-hydro-naphthyl; anthracyl, etc.; aralkyl such as benzyl, phenylethyl, etc.; alkenyl such as methallyl, allyl, etc. The above radicals may contain inorganic substituents such as halogens, etc.

If the hydrolyzable group or groups of all of the silanes in the mixture to be hydrolyzed are halogens, it is preferable to employ dioxan as the solvent because it is inert to the halogens. If the mixture contains both halogens and alkoxy groups the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above-described method, the slow incorporation of water into the homogeneous solution insures that hydrolysis is not permitted to proceed unchecked, whereby the more reactive silane, or silanes, would be more completely hydrolyzed and condensed before the less reactive have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of silicon atoms bearing different numbers and kinds or organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. Many of them are thermoplastic, some are thermosetting, and some are thermally stable liquids. Further condensation and polymerization may be brought about by heating, which generally results in an increase in viscosity and in some cases, if carried to completion, results in resinous solid products. The desired degree of polymerization will depend largely upon the contemplated use of the product and may be varied at will, since the final physical properties depend directly on the total number of siloxane linkages per molecule and the disposition of the siloxane linkages, this being controlled by the relative amounts of the various types of silanes initially present.

The partially dehydrated organo-siloxanes or hydrolysis products, after removal of solvents, are generally liquids of various viscosities and they vary in the extent to which dehydration has occurred at this stage. The ease of dehydration and the physical properties of the completely condensed organo-siloxanes vary with the kind of substituted organic radicals and with their number or with the final ratio of oxygen to silicon. Subsequent heating is usually necessary for complete dehydration, particularly when the oxygen to silicon ratio is greater than one. The extent of heating necessary depends upon the ease of dehydration which in turn depends upon the molecular size of the organic radical or radicals present and the number of possible siloxane linkages, that is, the final oxygen to silicon ratio. Products containing methyl radicals dehydrate more readily than those containing ethyl, propyl, etc., radicals or phenyl radicals and in general products containing alkyl radicals dehydrate more readily than those containing aryl radicals. Ease of dehydration also increases as the number of radicals per silicon atom increases or as the final oxygen to silicon ratio decreases. When this ratio is less than one, the organo-siloxanes are oils of relatively low viscosity. Their volatility decreases with increasing molecular size of the radicals and at the same time the viscosity may increase somewhat. As the final oxygen to silicon ratio increases from 1.0 to 1.3, there is a corresponding increase in molecular complexity or the number of siloxane linkages and an accompanying increase in viscosity. When the ratio is in the neighborhood of 1.3 and aryl radicals predominate, particularly on the mono-substituted silicon atoms, the viscosity increases to such an extent that the organo-siloxanes are thermoplastic solids which may be fused and solidified repeatedly by heating and cooling. As the oxygen to silicon ratio is increased to the neighborhood of 1.5 and beyond (approaching 2), the organo-siloxanes tend to become thermosetting and more particularly, if the molecular size of the radicals is decreased.

Thus it will be seen that uniformity of behavior not only makes possible a wide variation in properties of the compositions, including viscosity, vapor pressure, melting range, setting rate, hardness, toughness, etc., but it also enable one to predict the most suitable combination of intermediate compounds for the production of an organo-siloxane for the desired purpose.

The organo-siloxanes which are produced by my method may be represented as combinations of the units

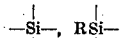

and $R'R''R'''Si-$, bearing in mind that these units are chemically combined with each other by siloxane linkages, that the percentage of each unit may be varied at will, and that the properties of the resulting products will show corresponding variations which can be predicted in making compositions for a particular purpose. It is also to be understood that the units may be joined in a multiplicity of ways to form chain and cyclic structures and combinations thereof. Also, the organic radical or radicals in each structural unit may be varied in kind.

The following examples will illustrate the mode of operation of the process and the character of the resulting products.

*Example 1*

One molecular part of tribenzyl silicol was added to a mixture of one molecular part of silicon tetrachloride and one molecular part of benzyl-silicon trichloride. On warming gently so that the more volatile components of the mixture were retained by reflux, the crystals of tribenzyl silicol were dissolved. The solution was then diluted with an equal volume of dioxan. A mixture of water and dioxan, one to one by volume, was added dropwise until a slight turbidity was evident. The solution was freed of volatile materials under reduced pressure. The material was viscous oil which was still liquid after heating 18 hours at 180° C. but which set to a relatively soft resin on cooling after such heating.

*Example 2*

A mixture of $Si(OC_2H_5)_4$, 16.64 gms. (.08 mol), $(C_6H_5)SiCl_3$, 8.44 gms. (.04 mol), and

14.16 gms. (.12 mol) was stirred and treated dropwise with 5.04 gms. of $H_2O$ over a period of 45 minutes to bring about hydrolysis. After adding the above amount of water, another gram of water was added and the reaction mixture allowed to stand overnight. After again stirring the reaction mixture for a few minutes it was heated to boiling for 5-10 minutes and then washed to neutrality using diethyl ether as a solvent. The solvent and residual water were removed by placing the mixture under vacuum and warming. An oily liquid amounting to 18.8 gms. and having a viscosity of 1,320 centistokes was obtained. The liquid product was very fluid at 190° C. and remained essentially unchanged in 3½ hours at this temperature. On raising the temperature to 250° C. for 3 hours, the liquid set to a resinous solid.

*Example 3*

A mixture of 10.4 grams of $Si(OC_2H_5)_4$, 28.8 grams of $C_2H_5Si(OC_2H_5)_3$ and 12.1 grams of $(C_6H_5)_2(CH_3)Si(OC_2H_5)$ was prepared. To this, 10 milliliters of 0.5% hydrochloric acid was added dropwise with shaking over a period of thirty minutes at room temperature. The mixture separated into two layers. The layer containing the organo-siloxane was diluted to 125 milliliters with diethyl ether. To this solution 15 milliliters of concentrated hydrochloric acid was added to give a one phase system. This was stirred for 1½ hours. It was then diluted with an excess of water and the ether solution which separated out was washed once. Another 15 milliliters of concentrated hydrochloric acid was added to the ether solution and the mixture was stirred for another hour. The mixture was again diluted and the ether solution was washed to neutrality. The solvent was removed under reduced pressure leaving a very viscous liquid.

A sample of the liquid product set to a resinous solid after 17 hours at 190-200° C. Another sample set to a solid in the absence of air after being heated for 5½ hours at 250° C.

*Example 4*

A mixture containing 10.4 grams of $Si(OC_2H_5)_4$, 8.9 grams of $CH_3Si(OC_2H_5)_3$ and 24 grams of $(CH_3)_3SiOC_2H_5$ was prepared. A small drop of concentrated aqueous NaOH was added followed by 5.4 grams of water dropwise with stirring and some warming. After standing overnight another small drop of aqueous NaOH was added and the mixture distilled to remove alcohol and any volatile polymers. After reaching 100° C. the alcoholic distillate was diluted with water to remove any trimethylsilicyl ether formed in the reaction. This gave 9 grams of the ether. On filtering the undistilled portion of the product .12 gram of solid matter which was largely silicic acid was recovered. The product was dried under vacuum leaving a very viscous liquid weighing 8.77 grams. On the basis of calculations there should be 2.9 grams of

3.55 grams of $CH_3SiO_{3/2}$, leaving 2.5 grams of $(CH_3)_3SiO_{1/2}$. The effect of the tri-methyl silicyl units is very noticeable. Without them, an insoluble gel would have resulted immediately. The product as obtained was only hardened a relatively small amount on the hot plate at 180–190° C. for an hour. On cadmium plated copper, the product in a thin film set in 15 minutes.

As has been pointed out, it is possible to predict the general properties of the inter-condensates on the basis of the oxygen/silicon ratio and the secondary effect of the size of the organic radicals. However, in all organo-silicon compounds the thermal stability of the carbon-silicon linkage varies with the kind of radical. It is necessary to take this into account when considering uses for organo-siloxanes. In general, there is a decrease in thermal stability with increase in size of aliphatic radicals. This is clearly shown by comparison of the thermal behavior of organo-siloxanes containing methyl radicals with those containing dodecyl radicals. The compositions containing allyl, methallyl, benzyl and phenyl-ethyl radicals, are relatively less stable than compositions containing such radicals as phenyl, methyl, ethyl, etc. Therefore, certain temperature limitations are encountered in their uses.

It will be seen that the inter-condensates produced by my method are not mixtures of individual organo-siloxanes but are new compounds differing therefrom in homogeneity of structure and properties. It will further be seen that the new organo-siloxanes may contain various different radicals attached to the same silicon atom and the individual silicon atoms may differ in the number and kind of radicals in which respect the new siloxanes differ from previous siloxanes where each silicon atom was attached to the same kind of radicals. Such differences result in new compounds or inter-condensates which embody various improvements over previous organo-siloxanes with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Products which remain liquid with little or no tendency for further polymerization even at elevated temperatures include products having an oxygen to silicon ratio between 0.5 and 1.0 and particularly those containing lower alkyl radicals. Such products have good electrical properties whereby they may be used as the liquid filling medium for transformers, circuit breakers, submarine cables, condensers, etc. In general these products have an unusually low coefficient of change of viscosity with temperature and may find use in hydraulic pressure systems which are subjected to wide changes of temperatures or as lubricants for systems of moving parts operating under subnormal or abnormal temperatures.

More viscous liquid products such as those wherein the oxygen to silicon ratio lies in the neighborhood of 1.0 or more may also be used for lubricants and are particularly useful as damping media in delicate instruments and the like.

Thermoplastic and thermosetting products having an oxygen/silicon ratio usually greater than 1.0 are useful as molding compounds, film forming coatings, varnishes, impregnating agents for electrical insulation and the like. They may be applied as solutions of the incompletely condensed organo-siloxanes and after evaporation of the solvent can be further polymerized in situ. The more brittle products should be useful embedding media for condenser plates as well as molding compounds. Such products usually have an oxygen/silicon ratio of 1.5 or greater and may be thermoset in situ by heat.

I claim:

1. The method which comprises hydrolyzing a mixture consisting of ethylorthosilicate, ethyltriethoxysilane and diphenylmethylethoxysilane in the molar proportions of approximately 1 to 3 to 1, respectively, and dehydrating the hydrolysis product.

2. An organosilicon composition comprising a copolymeric organo-siloxane comprising in the molecule, oxygen atoms and units which correspond substantially to the general formulae $=Si=$, $RSi\equiv$ and $R'R''R'''Si-$, respectively, said units being the only silicon units present in said organosilicon composition and being joined to each other by said oxygen atoms through silicon oxygen-silicon linkages, where R, R', R'', R''' are monovalent hydrocarbon radicals which are attached to silicon through carbon silicon linkages.

3. An organosilicon composition comprising a copolymeric organo-siloxane comprising in the molecule, oxygen atoms and units which correspond substantially to the general formulae, $=Si=$, $RSi\equiv$ and $R'R''R'''Si-$, respectively, said units being the only silicon units present in said organosilicon composition and being joined together by said oxygen atoms through silicon-oxygen-silicon linkages where some of the Rs are lower alkyl radicals and the rest are phenyl radicals, said radicals being attached to silicon through carbon-silicon linkages.

4. An organosilicon composition comprising a copolymeric organo-siloxane comprising in the molecule, oxygen atoms and units which correspond substantially to the general formulae, $=Si=$, $CH_3Si\equiv$ and $(CH_3)_3Si-$, respectively, said units being the only silicon units present in said organosilicon composition and being joined to each other by said oxygen atoms through silicon-oxygen-silicon linkages.

5. An organosilicon composition comprising a copolymeric organo-siloxane comprising in the molecule, oxygen atoms and units which correspond substantially to the formulae $=Si=$, $C_6H_5Si\equiv$ and $(CH_3)_3Si-$, respectively, said units being the only silicon units present in said organosilicon composition and being joined to each other by said atoms through silicon-oxygen-silicon linkages.

6. An organosilicon composition comprising a copolymeric organo-siloxane comprising, in the molecule, oxygen atoms and units which correspond substantially to the formulae $=Si=$, $C_2H_5Si\equiv$ and $(C_6H_5)_2(CH_3)Si-$, respectively, said units being the only silicon units present in said composition and being joined to each other by said oxygen atoms through silicon-oxygen-silicon linkages.

7. An organosilicon composition comprising a copolymeric organosiloxanes comprising, in the molecule, oxygen atoms and units which correspond substantially to the formulae $=Si=$, $C_2H_5Si\equiv$ and $(C_6H_5)_2(CH_3)Si-$, respectively, said units being the only silicon units present in said composition and being joined to each other by said oxygen atoms through silicon-oxygen-silicon linkages, the molar proportions of said units being approximately 1 to 3 to 1 respectively.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,068 | Rochow | Mar. 6, 1945 |

OTHER REFERENCES

Cusa et al., J. Chem. Soc. (London) 1932, pp. 2205-2209.

Meads et al., J. Chem. Soc. (London) 1914, pp. 679-690.